April 1, 1930.  J. W. PEASE  1,752,997
FRUIT PARING MACHINE
Filed Feb. 20, 1928   3 Sheets-Sheet 1

INVENTOR
John W. Pease
BY
Cumpston + Griffith
his ATTORNEYS

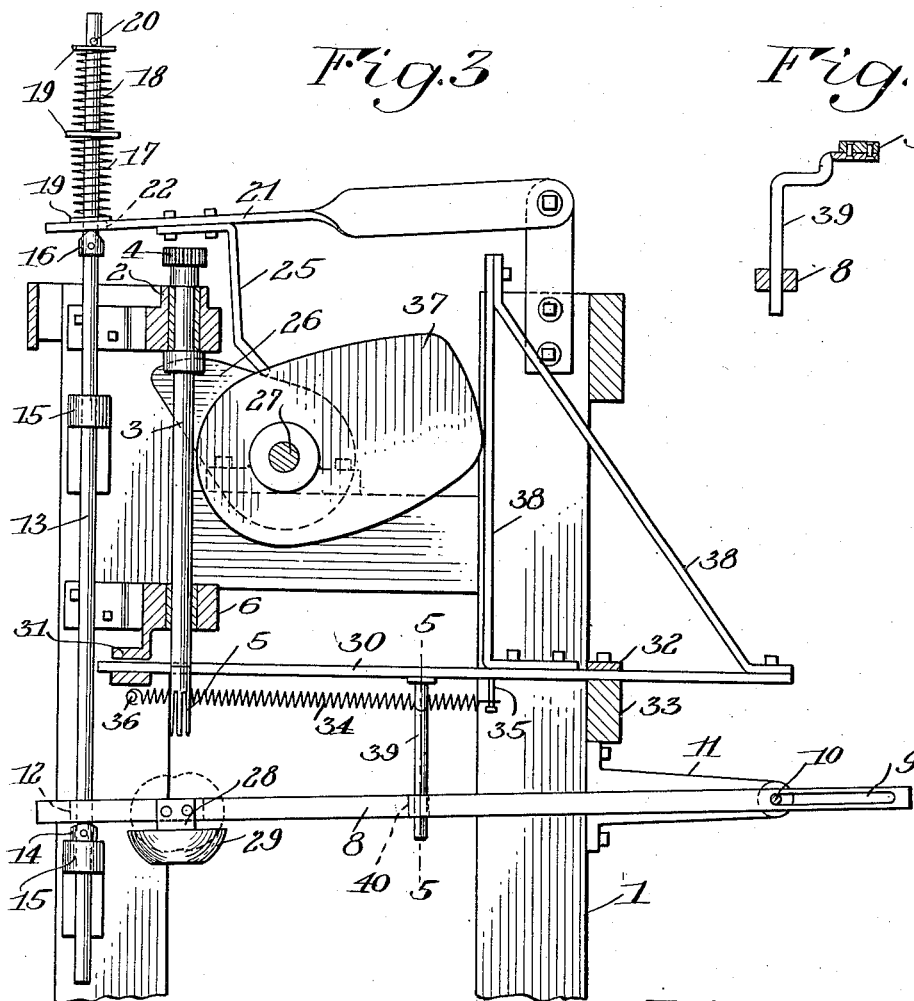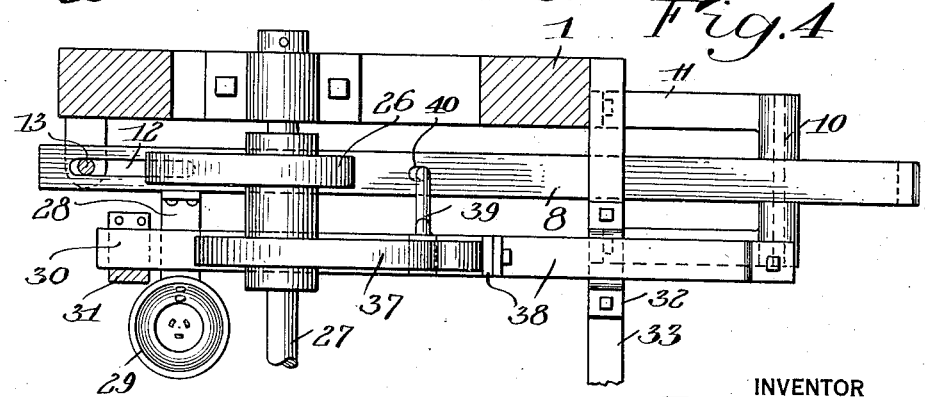

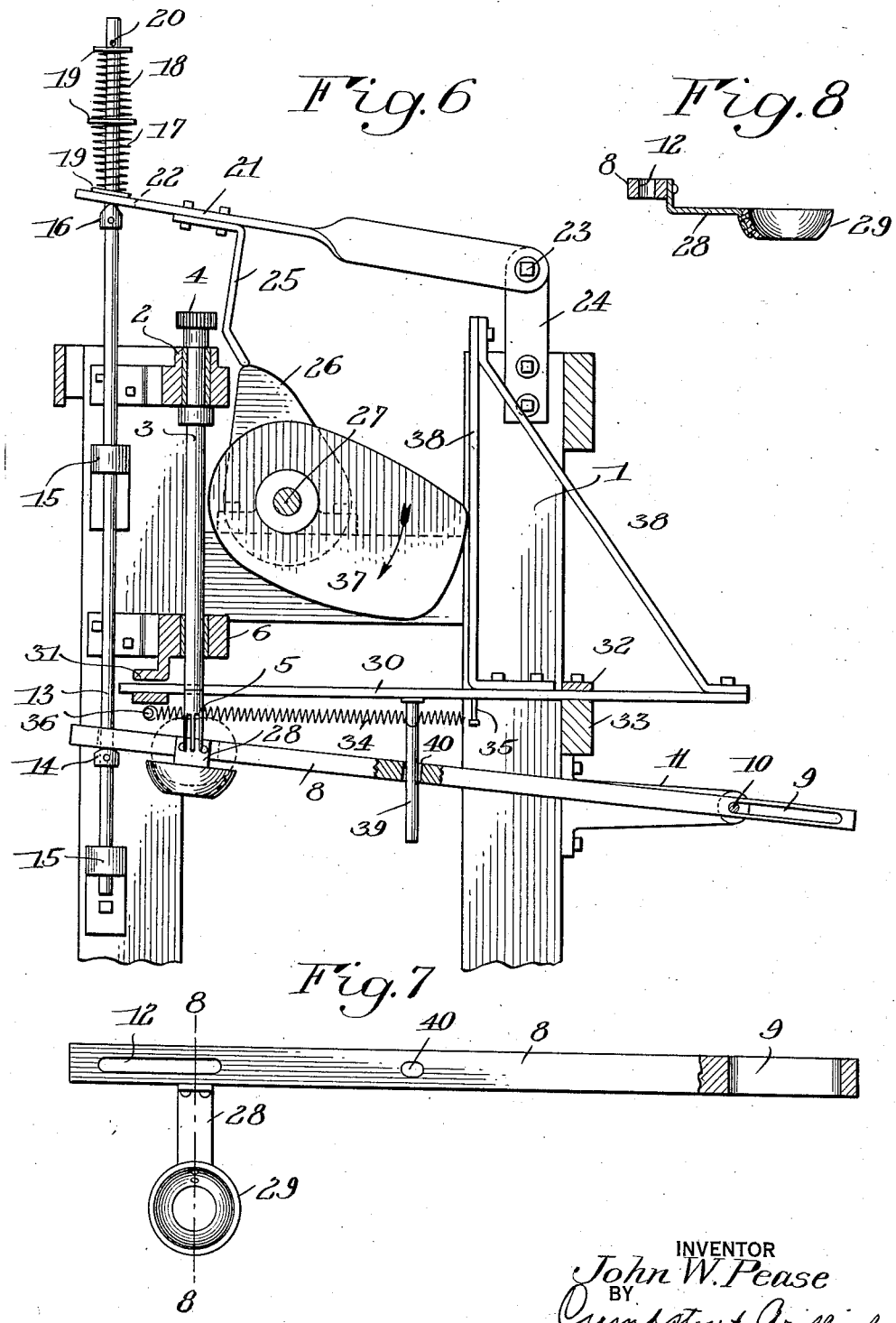

Patented Apr. 1, 1930

1,752,997

UNITED STATES PATENT OFFICE

JOHN W. PEASE, OF ROCHESTER, NEW YORK

FRUIT-PARING MACHINE

Application filed February 20, 1928. Serial No. 255,510.

My present invention relates to fruit paring machines and more particularly to machines of the nature of apple parers which usually embody relatively rotary holding and paring elements to which the apples or other fruit are intermittently fed, and the invention has for its object to provide a simple and efficient feeding mechanism whereby the apple or other fruit article is carried from a receiving tank accessible to the operator to a point at which it is delivered in a rapid and simple manner to the holding device that retains it in proper relationship to the paring knife or its equivalent.

To these and other ends the invention resides in certain improvements and combinations of parts, all as will be hereinafter more fully described, the novel features being pointed out in the claims at the end of the specification.

In the drawings:

Fig. 3 is a view similar to Fig. 1 but showing the parts at a different point in the cycle of operation, namely one in which the fruit article has been carried from its receiving position to one in which it is about to be applied to the paring mechanism;

Fig. 4 is a fragmentary view partly in horizontal section and corresponding to Fig. 2, but showing the plan view of certain feeding elements in the position of Fig. 3;

Fig. 5 is a detail section on the line 5—5 of Fig. 3;

Fig. 6 is a vertical section corresponding to Figs. 1 and 3 but showing the parts in still a different position in the cycle of movement of the machine, namely, one in which the fruit article has been carried by the feeding mechanism to the holding element of the paring knife;

Fig. 7 is a detail top plan view of the feeding arm; and

Fig. 8 is a transverse section thereof through the fruit support taken on the line 8—8 of Fig. 7.

Similar reference numerals throughout the several views refer to the same parts.

Figure 1:
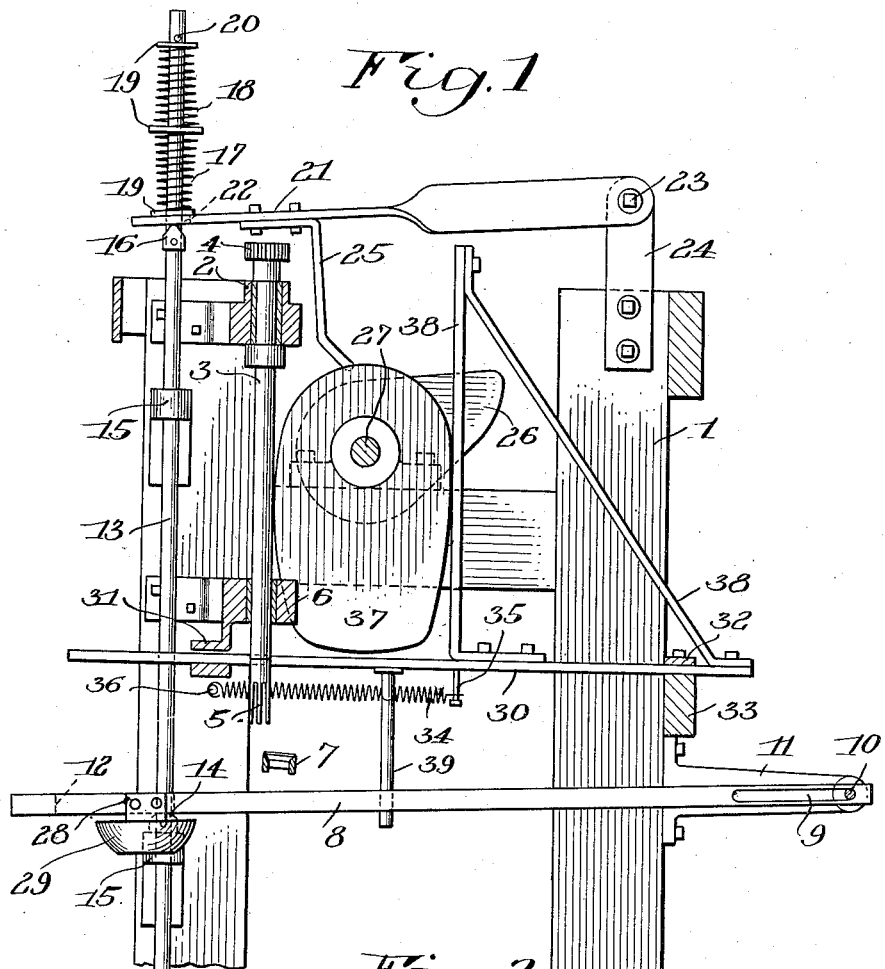
Fig. 1 is a vertical section through a paring machine provided with a feeding mechanism constructed in accordance with and illustrating one embodiment of my invention, the paring mechanism being shown rather diagrammatically and the feeding mechanism being shown in this figure in its receiving position.
Figure 2:
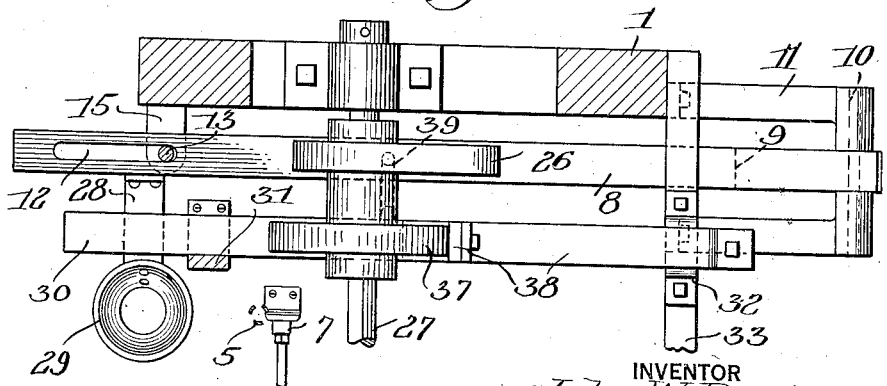
Fig. 2 is a fragmentary view partly in horizontal section showing in plan certain elements of the feeding mechanism.

The present machine is an improvement upon that shown in my prior copending application Serial No. 85,196, entitled Apple paring machine, filed February 1st, 1926, and allowed October 26, 1926. This invention contemplates in general the same relationship between a paring mechanism and a feeding mechanism, the two mechanisms operating in a necessarily timed relationship with each other. For this reason I have not shown in this application all the details of the paring mechanism or their coacting connections with the feeding mechanism. It is sufficient to say that a substantially similar paring mechanism may be used herewith.

Referring more particularly to the drawings 1 indicates the main frame or upright support of the machine. In a suitable bearing bracket 2 thereon is carried a vertically arranged fork spindle 3 driven from a pinion 4 at its upper end. The fork 5 at its lower end below the lower bearing bracket 6 will be referred to herein as the fruit holder. Cooperating therewith is a paring knife 7 and as shown in my said prior application the spindle 3 is preferably driven intermittently so that it receives the fruit article while it rests and rotates while the paring knife 7 is in cooperation with the fruit.

In the practice of my present invention I arrange below the fruit holding paring fork 5 a substantially horizontally arranged forwardly and rearwardly extending feeding lever 8. This lever is slotted at its rear end at 9 to reciprocate and to turn on a pivot 10 carried by a bracket 11 projecting rearwardly from the frame work 1. Its forward end as best shown in Fig. 7 is slotted at 12 to embrace the vertical push rod 13 and to normally rest upon an adjustable stop 14 thereon. The push rod 13 is mounted to operate in upper and lower guide brackets 15 on the frame 1. Above the frame it is provided with another adjustable stop or contact member 16 above which the push rod is surrounded by compression springs 17 and 18 abutting washers 19 and reacting against a retaining pin 20. The push rod is engaged and embraced between the stop 16 and the aforementioned springs by a lever 21 slotted at 22 to receive it. The springs hold the lever in contact with the stop 16 to permit it, without shock, to impart to the push rod a positive gravitating downward impulse and a yielding upward impulse.

This lever 21 is pivoted at 23 to a bracket 24 on the frame 1 and at an intermediate point it is provided with an arm 25 that rides upon a cam 26 on a tranverse shaft 27. The feed arm 8 is provided with a laterally extending bracket arm 28 shown in detail in Fig. 8, which carries a preferably cup shaped support 29 in which the fruit article is initially received and by which it is carried to the fruit holder 5 of the paring mechanism. The general arrangement is such that this fruit support 29 receives the fruit article at the front of the machine; moves rearwardly along a substantially rectilinear path until in alinement with the paring holder 5 and then moves upwardly toward the latter to impale the fruit article thereon. This is accomplished with the aid of the following mechanism.

A forwardly and rearwardly reciprocating bar 30 is suitable guided horizontally in the frame 1 as by a sliding mounting thereof at 31 of its forward end in the bearing bracket 6 and a sliding mounting at its rear end between cross pieces 32 and 33 on the frame 1. An extension coil spring 34 connected to it at 35 at one end and to a stationary part 36 of the frame 1 at the other end has a tendency to shift this bar 30 in a forward direction. It is positively actuated in a rearward direction by a cam 37 on the shaft 27 which, at a proper point in the cycle engages a contact frame 38 erected on the bar 30. The bar also carries, as shown in detail in Fig. 5, an offset downwardly projecting pin 39 that takes into an elongated opening 40 in the feed arm 8. The operation of the machine is as follows:

The normal or instant position of the parts is shown in Fig. 1. The fruit support 29 is in a lowered forward position and accessible to the hand of the operator to place an apple or other article therein. At this time the cam 37 operating in the direction at the arrow engages the frame 38 as shown in Fig. 3 and moves the bar 30 rearwardly. In doing so it also carries rearwardly with it through the pin 39 the feed arm 8 which slides upon its pivot 10 during this movement. This brings the supporting cup 29 beneath and in alinement with the rotary fork or fruit holder 5 which is timed to then be at rest with the knife 7 out of the way.

During these movements the contact arm 25 of the lever 21 is on a low point of the cam 26 which accounts for the lowered position of the supporting cup 29. But with the further rotation of the shaft 27 the contact arm 25 rises on the cam 26 to the high point thereof as shown in Fig. 6, so that the arm 21 through the springs 17 and 18 yieldingly raises the push rod 13 and through the contact member 14 raises the feed arm 8 which swings upwardly on its pivot 10 at the forward end of its slot 9. The fruit is thus impaled upon the fork or other holder 5. As the shaft 27 rotates still further, the contact arm 25 drops suddenly from the high point thereof lowering the push rod, and permitting the feed arm 8 to drop away from the fork of the bearing mechanism. It is then carried back longitudinally and forwardly to the initial position through the influence of the spring 34, the cam 37 at its high point having passed in engagement with the contact spring 38 as shown in Fig. 1.

I claim:

1. In a fruit paring machine, the combination with relatively rotary holding and paring elements, of a feeding device embodying a fruit support having a rectilinear movement from a receiving position to one in alinement with the holding element and means for actuating the support toward the holder in a relatively transverse direction while the holder is alined therewith, the bud and stem axis of the fruit being maintained substantially parallel to that of the holding element throughout the operation.

2. In a fruit paring machine, the combination with relatively rotary holding and paring elements, of a feeding device embodying a fruit support having a rectilinear movement from a receiving position to one in alinement with the holding element and means for swinging the support toward the holder in a relatively transverse direction while the holder is alined therewith, the bud and stem axis of the fruit being maintained substantially parallel to that of the holding element throughout the operation.

3. In a fruit paring machine, the combination with relatively rotary holding and paring elements, of a feeding device embodying an arm and a fruit support thereon, means for operating the arm in a longitudinal direction to carry the fruit support rectilinearly from a receiving position to one in alinement with the holding element and means for actuating the arm toward the holder in a relatively transverse direction while the holder is so alined therewith, the bud and stem axis of the fruit being maintained substantially parallel to that of the holding element throughout the operation.

4. In a fruit paring machine, the combination with relatively rotary holding and paring elements, of a feeding device embodying an arm and a sliding pivot therefor and a fruit support on the arm, means for operating the arm in a longitudinal direction on its pivot to carry the fruit support rectilinearly from a receiving position to one in alinement with the holding element and means for actuating the arm with a swinging movement on its pivot to carry the support toward the holder in a relatively transverse direction while the holder is alined therewith, the bud and stem axis of the fruit being maintained substantially parallel to that of the holding element throughout the operation.

JOHN W. PEASE.